United States Patent
Shih et al.

[15] 3,655,329
[45] Apr. 11, 1972

[54] POLY ALUMINUM HYDROXY COMPLEXES AND PROCESS FOR THEIR PRODUCTION

[72] Inventors: I-Kao Shih; Eric Blaser, both of, Toronto, Ontario, Canada

[73] Assignee: Warner-Lambert Company, Morris Plains, N.J.

[22] Filed: Jan. 2, 1968

[21] Appl. No.: 789,059

[52] U.S. Cl. ..............................23/50 R, 23/315, 260/448, 424/154, 424/157
[51] Int. Cl. .........................................................C01f 1/00
[58] Field of Search ...............23/50, 315; 260/448

[56] References Cited

UNITED STATES PATENTS

| | | | |
|---|---|---|---|
| 2,791,486 | 5/1957 | Appell | 23/50 |
| 3,056,725 | 10/1962 | Rinse et al. | 23/50 UX |
| 3,184,490 | 5/1965 | Davison | 260/448 X |
| 3,476,509 | 11/1969 | Jones | 23/50 |

OTHER PUBLICATIONS

Qunabe " American Perfumes & Cosmetics," Vol. 77, 1962, pp. 25- 30.

*Primary Examiner*—Herbert T. Carter
*Attorney*—Albert H. Graddis, Henry E. Millson, Jr., Frank S. Chow, Neil D. Edwards and Anne M. Kelly

[57] ABSTRACT

A new class of poly aluminum hydroxy complexes of the formula:

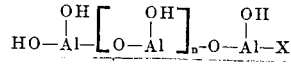

which are prepared by neutralizing poly aluminum hydroxide with a water soluble acid having a pKa of less than 5, for example, hydrochloric acid, hydrobromic acid, nitric acid, lactic acid, acetic acid, to obtain poly aluminum hydroxy complex of the formula: PAH−X, in which PAH is poly aluminum hydroxy and X is the anion; the PAH−X thus formed can be treated further with aqueous solution of water soluble salts to make other derivatives. These poly aluminum hydroxy (PAH−X) complexes are useful as deodorant, anti-perspirant and astringent agents.

1 Claim, No Drawings

POLY ALUMINUM HYDROXY COMPLEXES AND PROCESS FOR THEIR PRODUCTION

The present invention relates to a novel class of poly aluminum hydroxy complexes having the structural formula:

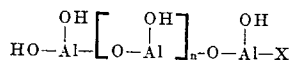

wherein $n$ is an integer from 5 to 9 and X is a physiologically acceptable anion, for example, chloride, sulfate, acetate, nitrate and the like. These complexes are abbreviated as PAH—X hereinafter, in which X is as defined.

PAH-X of this invention are soluble in water and their aqueous solution is mixable with alcohol or acetone and coagulate upon the addition of electrolytes or mineral acids.

PAH—X of this invention are useful as deodorant, anti-perspirant and astringent agents. Additionally, these compounds exhibit anti-microbial activity against both gram positive and gram negative bacteria, for example a 10 percent solution of PAH acetate was found to exhibit bactericidal activity against Staphylococcus epidermidis, Streptococcus faecalis, Escherichia coli, Proteus vulgaris, Enterobacter aerogenes, Bacillus subtilis, and Pseudomonas aeruginosa.

In use, the selected PAH—X is dissolved or suspended in a suitable dermatologically acceptable carrier, such as water, cream, and may be applied to areas such as the armpit in the form of an aerosol to achieve the desired deodorant, anti-bacterial, or anti-perspirant effects. Generally speaking, the final formulations contain from about 5 percent to about 15 percent by weight of the active ingredient.

They may also be formulated into preparations, such as lotions, deodorant sticks, powders for example, in accordance with the disclosure in Drug and Cosmetic Industry, Vol. 81, No. 2, pages 176–8, 1957. These various dosage forms and topical applications are also within the scope of this invention.

The complexes of this invention possess many other unexpected advantages over previously known aluminum chloride and their derivatives which have been used as deodorants, astringents and the like. One of the major advantages resides in the unexpected findings that the complexes of this invention are non-damaging to clothes and non-irritating to the skin due to their low acidity as compared with other well known deodorants, such as aluminum chloride, aluminum sulfate. Thus, for example, a 10 percent w./v. of PAH—Cl has a pH of 4.2, while a 10 percent w./v. of aluminum chloride 6 $H_2O$ and a 10 percent w./v/ aluminum sulfate 18 $H_2O$ have a 2.5 and 3.1, respectively.

Another major advantage resides in the fact that the complexes of this invention are much stronger protein precipitants, as for example, towards proteins, such as egg albumin, pepsin than any of the anti-perspirant compositions containing aluminum derivatives. Thus, for example, when 5 ml. of 1 percent w./v. solution of PAH—Cl is added to a 5 ml. of a 1 percent w./v. solution of egg albumin, a voluminous precipitant results. On the other hand, a 5 ml. of 1 percent w./v. solution of alcohol aluminum sulfate, or chlorhydrol when mixed with a 5 ml. solution of a 1 percent solution of egg albumin, no significant precipitation is observed. This is a very desirable property because anti-perspirants act by their power to swell and coagulate skin protein and thus reduce the size of the opening through which perspiration is discharged. PAH—X being stronger protein precipitants are therefore more effective than those which are weaker protein precipitants. Furthermore, because the complexes of this invention are polymers, they form a strong film on the skin or other surface areas to give better protection and longer duration.

According to the process of this invention, the aforesaid complexes are prepared as exemplified in the following steps:

Aluminum salts, preferably aluminum halides, for example, aluminum chloride, but not the sulfates, are treated with an alkali, for example, ammonia hydroxide, sodium hydroxide, potassium hydroxide, at a ratio of about 1 part aluminum ion to about 3 parts hydroxy ion. The reaction is effected in water at a temperature range of about 10° to 60° C., preferably 10° to 30° C. The poly aluminum hydroxide thus formed precipitates out of solution and is washed with water until it is totally free of the anion. It can be dried for storage or can be used for further processing without additional treatment.

To convert the poly aluminum hydroxy to the poly aluminum hydroxy complexes of this invention, the poly aluminum hydroxy is dissolved in an acid. Among the acids which can be advantageously employed in our invention are those acids which are water soluble and have a pKa of less than 5, for example, hydrochloric acid, hydrobromic acid, nitric acid, citric acid, acetic and the like. A molar ratio of about 0.9 poly aluminum hydroxy to about 1.1 of the acid is employed. This reaction is also carried out from about 10° to 60° C., and preferably from 10° to 30° C. The resulting poly aluminum hydroxy-X thus obtained can be removed from the reaction mixture by removal of solvent or filtration techniques. The product can be dried at a temperature of 25° to 105° C.

The following examples are included in order further to illustrate the invention.

EXAMPLE 1

242 grams of aluminum chloride having the formula: $AlCl_3 \cdot 6H_2O$ is dissolved in one liter of water. In a separate vessel 220 ml. of a 28 percent solution of ammonia hydroxide is diluted with water to give a final volume of three liters. The ammonia hydroxide solution is then added to the aluminum chloride solution with agitation until precipitation is complete. The reaction mixture is filtered, the filtrate is washed with more water until it is free from any chloride ion. The poly aluminum hydroxy having the formula:

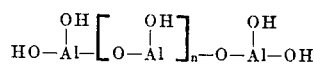

is then dried at a temperature of about 105° C. This product has the following chemical characteristics:

1. It reacts readily with strong acids, e.g., hydrochloric.
2. It has a high oxide content of 81 percent while $Al(OH)_3$ has an oxide content of about 66 percent.

EXAMPLE 2

100 g. of the poly aluminum hydroxy obtained as described in Example 1 is dissolved in 720 ml. of 0.25 N hydrochloric acid, the reaction mixture is filtered to obtain a filtrate containing the desired poly aluminum hydroxy chloride which is treated at about 45° C. The poly aluminum hydroxy chloride thus obtained has the following chemical characteristics:

1. It is not decomposed by any diluent or strong acids, e.g., hydrochloric acid, sulfuric acid, etc. at room temperature, while chlorhydrol is readily decomposed in 0.1 N HCl.
2. It is coagulated by any electrolytes while chlorhydrol lacks this general property.
3. On evaporation, the product gives a glassy sheet, while chlorhydrol lacks this property.

EXAMPLE 3

100 g. of PAH is dissolved in 500 ml. of 0.25 N acetic acid. The solution is agitated, allowed to stand and filtered overnight. The solution is dried to obtain the poly aluminum acetate.

EXAMPLE 4

The following is an example of how to incorporate the poly aluminum hydroxy chloride of this invention into a deodorant composition:

| a. | PAH-Cl | 5 | grams |
| b. | Benzalkonium chloride | 0.1 | grams |
| c. | Glycerol | 4 | grams |
| d. | Alcohol (95%) | 50 | ml |
| Perfume | | q.s. | |
| Water | q.s. | 100 | ml |

Method: Dissolve 5 grams of (a) in 45 ml. water. Add (b) and (c); add (d) and make up to volume with more water.

EXAMPLE 5

The following is an example of how to incorporate the poly aluminum hydroxy chloride of this invention into a deodorant composition:

| a. | PAH-Acetate | 5 | grams |
| b. | Benzalkonium chloride | 0.1 | grams |
| c. | Glycerol | 4 | grams |
| d. | Alcohol (95%) | 50 | ml |
| Perfume | | q.s. | |
| Water | q.s. | 100 | ml |

Method: Dissolve 5 grams of (a) in 45 ml. water. Add (b) and (c); add (d) and make up to volume with more water.

EXAMPLE 6

The anit-mircobial activity of the complexes of this invention is evaluated in accordance with the procedure described in *Disinfection, Sterilization* and *Preservation* by Carl A. Lawrence and Seymour S. Block (Lea and Febiger Philadelphia, 1968). A 10 percent PAH-acetate solution in water is tested against Staphylococcus aureus (ATCC 6538), Staphylococcus epidermidis, Streptococcus faecalis, Escherichia coli, Proteus vulgaris, Enterobacter aerogenes, Bacillus subtilis, Pseudomonas aeruginosa. It was found that using the procedure described in the book, a 10 percent PAH-acetate solution was found to be effective to kill the aforesaid bacteria within 3 minutes.

It is understood that the foregoing detailed description is given merely by way of illustration and that many variations may be made therein without departing from the spirit of our invention.

Having described our invention, what we desire to secure by Letters Patent is:

1. A process for the production of poly aluminum hydroxy salts which comprises treating a solution of an aluminum halide with an alkali hydroxide solution maintaining a molar ratio of about 1 to 3 respectively, maintaining the temperature in a range of from about 10° to 60° C., washing the poly aluminum hydroxide precipitate thus formed with water until free of unreacted reagents, contacting the poly aluminum hydroxy thus obtained with a water soluble acid having a pKa of less than 5 while maintaining a molar ratio of about 0.9 to 1.1 respectively, removing the poly aluminum hydroxy salt thus formed from the reaction vessel and drying the poly aluminum hydroxy salt at a temperature of 25° to 105° C.

* * * * *